April 29, 1969 W. J. KUDLATY 3,441,143
PLURAL ELEMENT FILTER ASSEMBLY
Filed Feb. 10, 1967
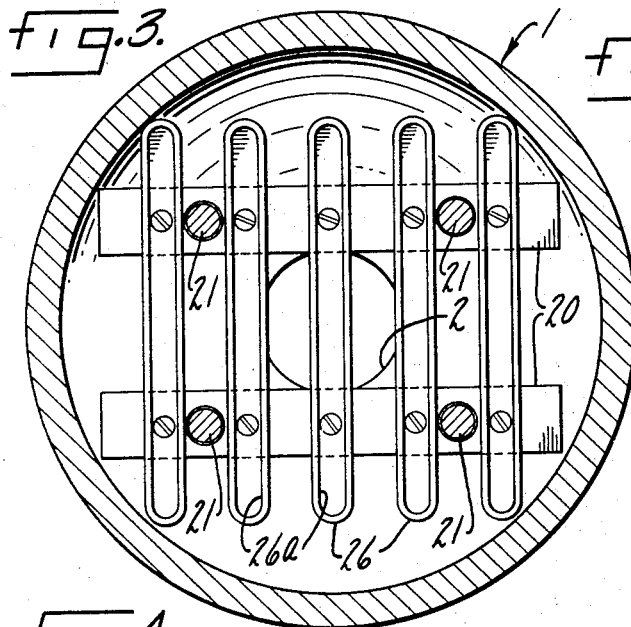
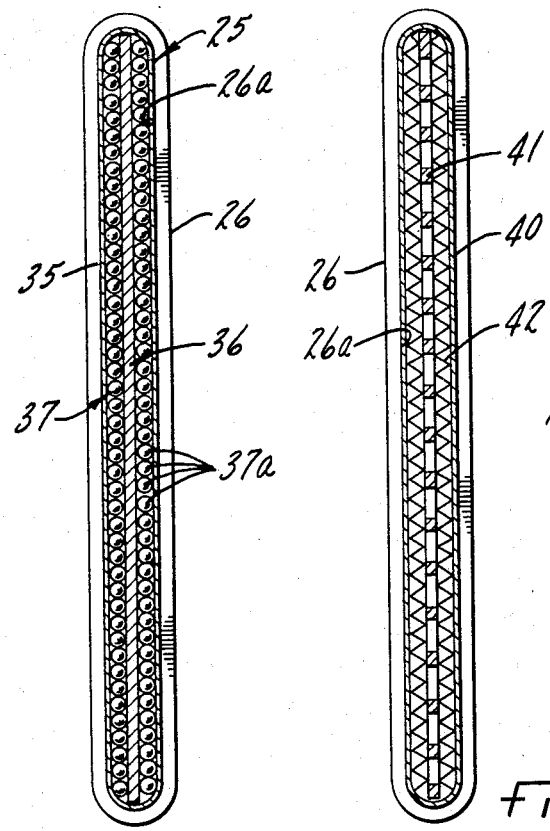
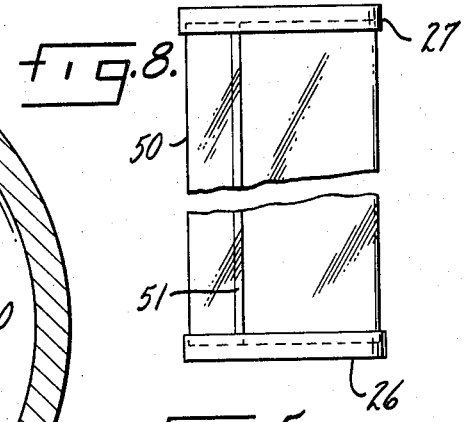
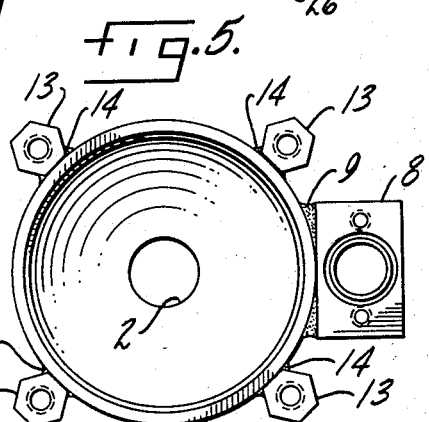
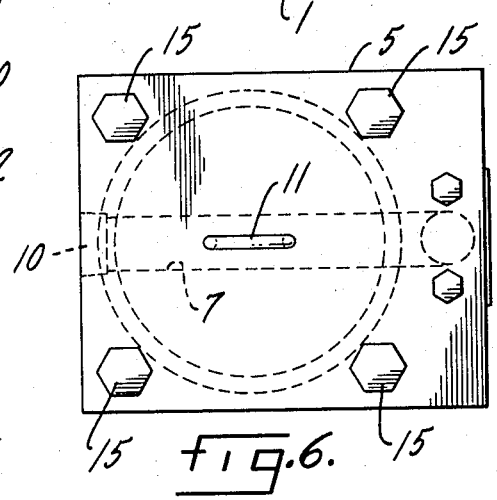
INVENTOR.
Walter J. Kudlaty,
BY Parker & Carter
Attorneys.

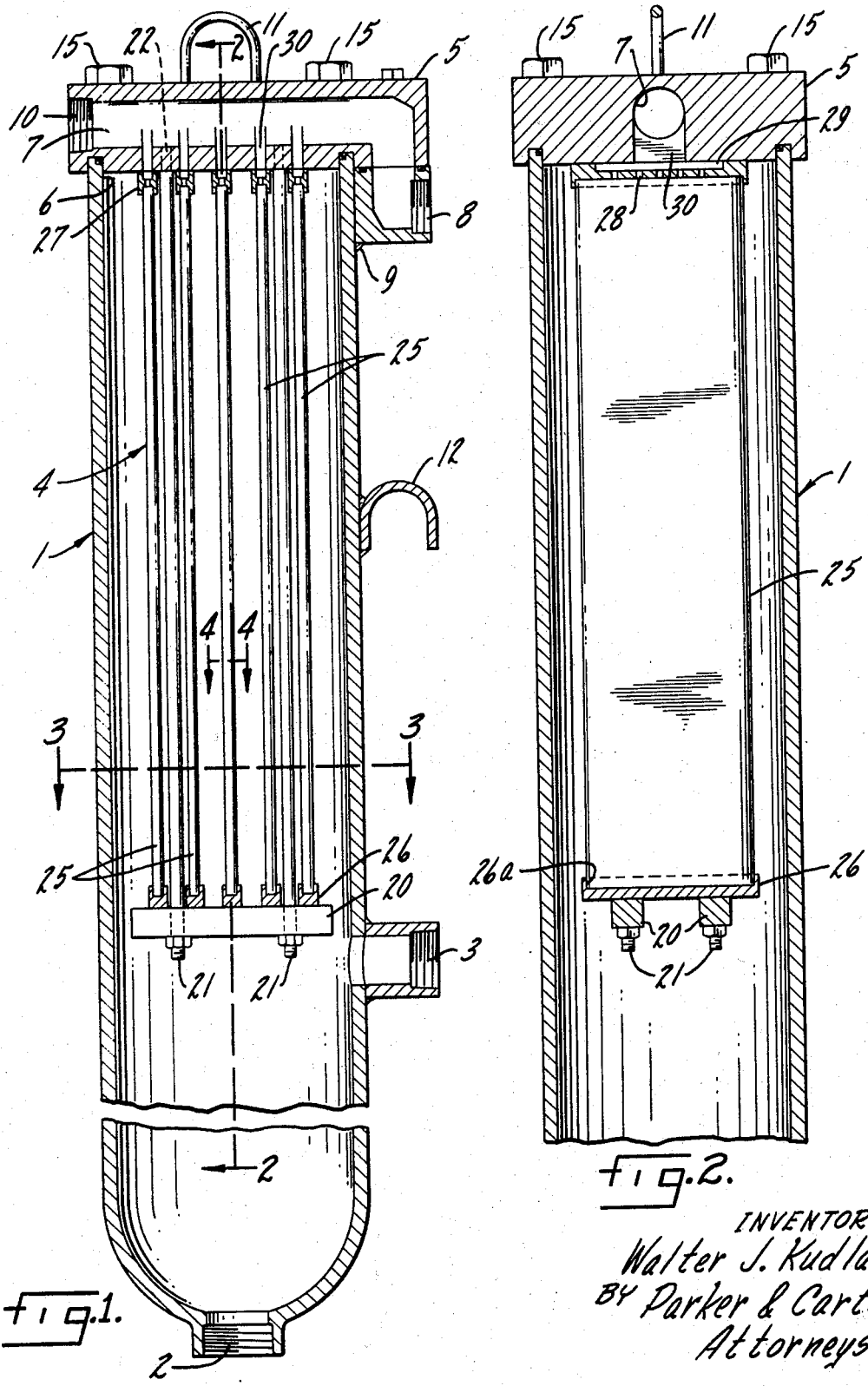

3,441,143
PLURAL ELEMENT FILTER ASSEMBLY
Walter J. Kudlaty, Elmhurst, Ill., assignor to Marvel Engineering Company, Chicago, Ill., a corporation of Delaware
Filed Feb. 10, 1967, Ser. No. 615,113
Int. Cl. B01d 25/04, 29/38, 29/20
U.S. Cl. 210—333
2 Claims

ABSTRACT OF THE DISCLOSURE

A filter in which fluid is fed to a housing between a lower sedimentation chamber and an upper bank of spaced filter elements, each element including a continuous filter surface internally supported to resist strong external pressures, one internal filter support portion consisting of a plurality of spherical members tangentially engaging the filter surface.

---

This invention relates to filtration and has particular relation to a filter capable of filtering a fluid such as water to remove undesirable particles of one micron and less in size.

Another purpose is to provide a filter assembly usable in the desalination of sea water and the filtration of brackish and waste water.

Another purpose is to provide a compact filter assembly having relatively large filtration and contaminant-collection areas.

Another purpose is to provide a filter element capable of withstanding high collapsing and columnar loading pressures.

Another purpose is to provide a filter assembly operable at ambient temperatures and subject to minimum electrolytic and corrosive action.

Another purpose is to provide a filter assembly adaptable to various regeneration processes including draining and flushing with filtered fluid, pneumatic, steam or liquid backwash and the employment of a solids scavenger.

Another purpose is to provide a filter element usable in a reverse osmosis filtering process.

Another purpose is to provide a filter assembly having provision for natural sedimentation and the avoidance of direct impingement of entering fluid upon the filter elements of the assembly.

Another purpose is to provide a filter assembly of maximum filtration capacity within a minimum construction envelope.

Another purpose is to provide a filter assembly of maximum simplicity and economy in construction, maintenance, assembly and disassembly.

Other purposes may appear from time to time during the course of the specification and claims.

The invention is illustrated more or less diagrammatically in the accompanying drawings, wherein:

FIGURE 1 is a side elevation with parts in cross section;

FIGURE 2 is a view taken on the line 2—2 of FIGURE 1;

FIGURE 3 is a view taken on the line 3—3 of FIGURE 1;

FIGURE 4 is a view taken on the line 4—4 of FIGURE 2;

FIGURE 5 is a detail view of a portion of the structure of the invention;

FIGURE 6 is a detail view of another portion of the structure of the invention;

FIGURE 7 is a view similar to that of FIGURE 4 and illustrating a variant form of the structure shown in FIGURE 4; and FIGURE 8 is a partial view illustrating a variant form of the structure illustrated in FIGURES 4 and 7.

Like parts are indicated by like numerals throughout the specification and drawings.

Referring now to the drawings, and particularly to FIGURE 1 thereof, numeral 1 generally indicates a housing. The housing has an outlet drain or cleanout opening 2 adjacent its lowermost portion. Intermediate its ends, the wall of housing 1 is apertured to provide the inlet 3. Beyond the inlet 3 from cleanout opening 2 a filtering structure, indicated generally by the numeral 4, is positioned within housing 1. A closure 5 is secured to and closes the otherwise open opposite end 6 of housing 1 from the drain outlet 2. The cover 5 has a manifold or header passage 7 extending therethrough and having a bend or elbow portion communicating with an outlet elbow fitting 8 secured, as by the weld 9 for example, to the wall of housing 1. The opposite end of header passage 7 from outlet fitting 8 communicates with threaded port 10 in the cover 5. A handle element 11 is secured to the upper surface of cover 5 and a support bracket 12 is secured to the outer surface of housing 1.

As may be best seen in FIGURES 5 and 6, a plurality of circumferentially spaced anchors 13 are secured, as by welds 14, to the outer surface of housing 1 and fasteners 15 secure the cover 5 to housing 1 through engagement with the anchors 13.

The filtering structure 4 includes the tie bars 20 positioned a substantial distance from cover 5 and secured thereto by elongated tie rods 21, the rods 21 being secured to the undersurface of cover 5, as indicated at 22.

Clamped between cover 5 and tie bars 20 by the rods 21 is a plurality of individual filter elements 25. Each of the filter elements 25 includes a lower closure or cover 26 seated on and extending across tie bars 20. Each filter element 25 has a similar closure or upper cover 27 seated against the lower or inner surface of cover 5. Each cover 27, however, has its central portion apertured at a plurality of points therealong, as indicated best at 28 in FIGURE 2. The apertures 28 communicate with the elongated chamber 29 formed by a recess in the outer surface of covers 27. Each of the chambers 29 communicates with one of the passages 30 which are formed in the lower surface of cover 5 and which in turn communicate with the manifold or header passage 7.

While the filter elements 25 are shown as five in number, substantially equally spaced along and across the tie bars 20 and of a generally elliptical cross-sectional configuration, it will be understood that the element 25 could vary in number and shape without departing from the nature and scope of certain areas of the invention.

It will be observed that the preferred filter element 25 shown herein takes the form of an elongated, relatively thin, plate-like member. A lower cover or closure member 26 has a generally elliptical planar configuration and a generally elliptical recess 26a into which one edge of an endless filter surface or wall 35 is received. The filter media surface or filtering wall member 35 takes in cross section the same elliptical conformation as that of the recess 26a. Extending spacedly within and centrally throughout the inner length and width of the filtering wall 35 is a solid center support plate 36. Between the opposite sides of center plate 36 and the opposed portions of filtering surface 35 is a coarse supporting structure 37. As shown in FIGURE 4, the supporting structure 37 is formed of a plurality of spherical elements 37a filling the space between plate 36 and wall 35 and having a diameter such as to bridge the space between center plate 36 and the opposed portion of filter wall 35, each element 37a thus making tangential contact with adjacent elements 37a and with plate 36 and wall 35.

Wall 35 is preferably formed of a continuous strip of sintered metal having a fluid permeability limited to as small as one micron or less. The elements 37a may be fused or joined in a sintered metal piece having a fluid permeability substantially greater than that of wall 35. Similarly, separate, individual elements 37a may, in contact with each other, fill the spaces on opposite sides of plate 36.

In the form shown in FIGURE 7 the filter media or sintered metal wall 40 of filter element 25 corresponds to that shown at 35 in FIGURE 4, but may be of a differing level of fluid permeability. The center plate 41 corresponds to plate 36 except that it is shown as conveniently formed of perforated metal. A support structure 42 is positioned in the place of support 37 and is formed of pleated or corrugated mesh ribbing or coarse sintered metal in an accordion-like pleated configuration. The valleys or roots of the pleats of support 42 are preferably welded or brazed to the center plate 41 and the ridges are in contact with inner surface of wall 40.

The closures 26 and 27 are secured to the opposite edges of walls 35, 40, supports 37, 42 and plates 36, 41 by an epoxy or by brazing or the like and similar metals are used throughout the assembly to minimize electrolytic action.

In FIGURE 8 a semipermeable or osmotic membrane 50, formed for example of cellulose acetate, overlies the entire outer surface of a filtering wall such as that shown at 35 or 40. The edges of the membrane 50 may conveniently contact or be received in covers 26, 27 and its opposite ends may be joined, as by heat sealing, for example, as indicated at 51.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

The fluid to be filtered is delivered under pressure at inlet 3. In relation to desalination and the employment of the reverse osmosis process, for example, such pressure will be of the order of 1500 p.s.i. In such event the form of the filter element illustrated in FIGURE 4 is employable and the membrane 50 may be positioned as illustrated in FIGURE 8. Heavier solids in the influent entering at inlet 3 will fall by gravity into the substantial sedimentation chamber provided within the housing 1 below inlet 3. Fluid entering inlet 3 will flow between and about the filter elements 25 in the bank 4 positioned in the upper portion of housing 1. Undesirable particles, such as salt in sea water, will be rejected by the membrane 50 supported against the high pressures involved by wall 35 and support 37 and 36. When the membrane 50 is not employed, the undesirable particles in the fluid entering at inlet 3 will be rejected by the filtering surface 35. In either event, plate 36 and support 37 enable the filtering wall 35 to withstand the high pressures employed and the filtered fluid, having passed through the filtering wall 35, moves upwardly through the spaces between elements 37a and through passages 28 in cover 27 into recess 29, thence through passages 30 and header passage 7 to outlet 8. The heat created by the pressure drop is thus carried off by the filtered fluid emanating from outlet 8 and may be suitably employed in other portions of the installation of which the filter assembly of the invention forms a part.

With respect to the filtering of brackish water and the reprocessing of plant waste water, the pressures involved, of the order of 750 p.s.i., are still high, but less than those above described and the filter element of FIGURE 7, with its strong filter surface support, is effective. The flow of fluid to be filtered follows the course above outlined, moving through the wall 40 to filter out deleterious particles and then upwardly between the ribs or corrugations of support 42 for passage through passages 28, 30 and 7 to outlet 8.

Installation and removal of the filter bank is easily effected. The handle or hook 11 provides a single point at which the cover 5 and the entire filter bank 4 are insertable and removable as a unit. With the outlet fitting 8 attached to the housing 1, the filter bank may be removed for cleaning or replacement without disturbing the piping (not shown) connected at inlet 3 and at outlet 8. Similarly, individual filter elements 25 are easily separated from cover 5 through disengagement of rods 21. The employment of rods 21 and tie bars 20 provides for maximum filtering fluid flow and minimum occupation of space by the housing 1. The threaded port 10 may be plugged for normal operation or may include an air vent fitting (not shown).

The filter elements may be regenerated in a variety of manners. The port 10 may be connected with a source of cleansing fluid under pressure whereby the outlet 8 may be closed off and the backwash fluid may be forced through header passages 7 and 30 and through cover passages 28 to flow outwardly through supports 37, 42 and filtering walls 35, 40 to dislodge deleterious particles collected thereon, the said particles being thereafter washed out through drain 2. Alternatively, sedimentation within the lower chamber may be removed from drain 2 and clean fluid may be flushed about the filter elements 25, with outlet 8 closed, to dislodge external deleterious particles for removal through drain 2. The spacing between filter elements 25 and the provision of the lower sedimentation chamber permits of installation of a mechanical scraper or scavenger structure (not shown) which may be moved along the outer surfaces of filter elements 25.

There is claimed:

1. A filter including a housing, a fluid entry communicating with the area within said housing, an outlet, a manifold member having a chamber communicating at one of its ends with said outlet, a plurality of elongated, platelike filter elements in said housing, the area within each of said filter elements communicating with said manifold chamber, the external surface of each of said filter elements being exposed to said area within said housing, said filter elements being spaced one from the other within said housing and from the walls of said housing, each of said filter elements comprising a continuous wall having an elliptical planar cross section, said wall including parallel side portions joined at their opposite ends by curved portions and defining a space within said wall, said wall being formed of sintered metal having a first fluid permeability, a support structure for said wall and substantially filling said space, said support structure including a plurality of spherical elements in tangential contact with the inner surface of said continuous wall and with each other, and a center plate having its opposite faces in tangential contact with said spherical elements, said support structure having a second fluid permeability greater than said first fluid permeability, opposite edge covers for said wall, each of said covers having a planar recess, the opposite edges of said wall and said support structure being received in and secured to said covers within said recesses, passages in one of said covers communicating with said manifold chamber, tie bars spaced from said manifold member and tie rods secured to said manifold member and said bars, said rods extending between said filter elements to clamp said filter elements between said tie bars and said manifold member.

2. The structure of claim 1 characterized by and including a reverse-flow entry port in said manifold member and communicating with said manifold chamber.

(References on following page)

References Cited

UNITED STATES PATENTS

| | | | |
|---|---|---|---|
| 1,632,960 | 6/1927 | Giese | 210—323 |
| 2,208,135 | 7/1940 | McCormack et al. | 210—323 |
| 2,562,730 | 7/1951 | Miller, Jr. | 210—510 X |
| 2,946,446 | 7/1960 | Howard | 210—323 |
| 3,133,132 | 5/1964 | Loeb et al. | 264—49 |
| 3,312,349 | 4/1967 | Rosaen | 210—315 X |
| 3,367,505 | 2/1968 | Bray | 210—321 |

FOREIGN PATENTS

| | | |
|---|---|---|
| 620,691 | 10/1935 | Germany. |
| 655,385 | 7/1951 | Great Britain. |

REUBEN FRIEDMAN, *Primary Examiner.*

FRANK A. SPEAR, Jr., *Assistant Examiner.*

U.S. Cl. X.R.

210—346, 486, 496, 510